United States Patent [19]

Herrgen

[11] 4,257,263
[45] Mar. 24, 1981

[54] TORQUE WRENCH
[75] Inventor: Rudolf Herrgen, Wermelskirchen, Fed. Rep. of Germany
[73] Assignee: Werkzeug-Union GmbH-DWU, Fed. Rep. of Germany
[21] Appl. No.: 49,495
[22] Filed: Jun. 18, 1979
[30] Foreign Application Priority Data Jul. 1, 1978 [DE] Fed. Rep. of Germany ....... 2829009

[51] Int. Cl.³ .............................................. G01L 5/24
[52] U.S. Cl. ................................. 73/139; 73/DIG. 4
[58] Field of Search ........................... 73/139, DIG. 4

[56] References Cited
U.S. PATENT DOCUMENTS

| 3,813,933 | 6/1974 | Weiss et al. ............................ 73/139 |
| 4,073,187 | 2/1978 | Avdeef .................................. 73/139 |

Primary Examiner—Donald O. Woodiel
Attorney, Agent, or Firm—Birch, Stewart, Kolasch & Birch

[57] ABSTRACT

The present invention is directed to a torque wrench wherein a head comprises an engaging member capable of being coupled, antirotationally, with a screw or the like. A handle lever is movable within limits relative to the engaging member and a load sensor is provided between the engaging member and the handle lever and controls an indicating means. The load sensor according to the present invention is a piezoelectric member fitted with electrodes connected with the input of an electric amplifier which is fed by a battery housed in the handle lever. The electric amplifier controls an electronic indicator which indicates the torque applied to a screw or the like.

7 Claims, 3 Drawing Figures

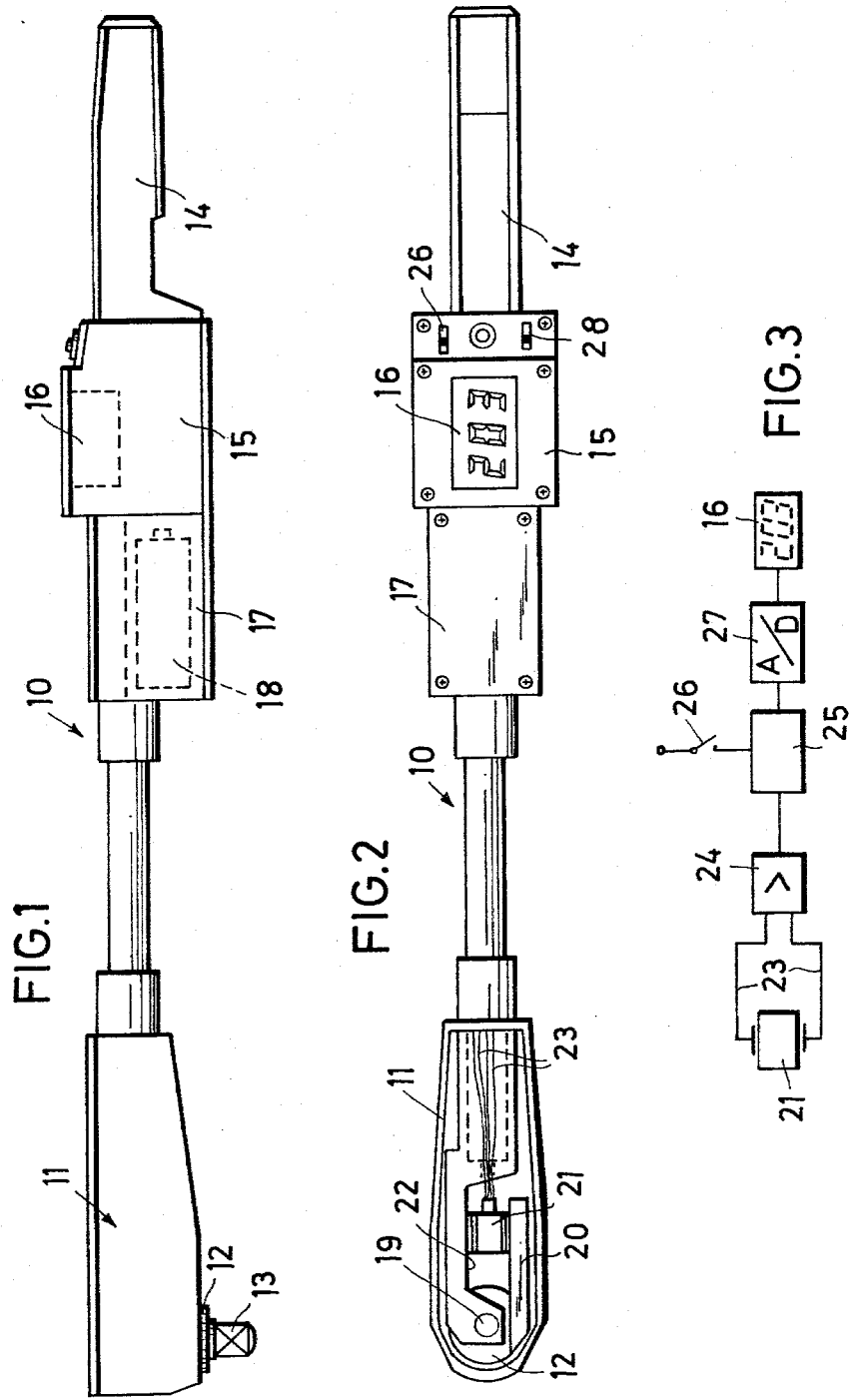

TORQUE WRENCH

BACKGROUND OF THE INVENTION

1. Field of the Invention

The invention relates to a torque wrench having a head comprising an engaging member capable of being coupled antirotatingly with a screw or the like, a handle lever movable within limits relatively to the engaging member and a load sensor provided between the engaging member and the handle lever and controlling an indicating means.

2. Brief Description of the Prior Art

Torque wrenches are used to measure the tightening torque of screws. Along with the progressive technical development, these tools are gaining more importance for assembly and mounting operations with complex technological implements calling for high requirements as to accuracy of tightening torques of screws. The known torque wrenches are operated either mechanically or electrically. As for mechanical torque wrenches, the tightening torque strains a mechanical expansion or torsion body whose deformation is made visible on a scale. In the electric instruments, the mechanical expansion or tension is converted into an electric voltage via wire strain gauges as converter elements. The value of the voltage can be made visible by means of an electric indicator. The electric torque measurement involves a high current consumption compared with the known torque wrenches so that the instruments tend to be heated, on the one hand, thus affecting the accuracy of the indication, on the other hand. Furthermore, the instruments have a high weight which strongly restricts their possible use. In addition the resistance wire strain gauges tend to fatigue, thus the accuracy of indication is additionally impaired.

SUMMARY AND OBJECTS OF THE INVENTION

It is the object of the invention to provide a torque wrench measuring completely electronically and having a low consumption of current so that no connection to an external current source is required. Thus, low heat development does not affect the measuring result. The torque wrench additionally shall be of a weight as low as possible, so that its possibilities of use shall not be reduced by the measuring device.

To solve the problems of the prior art, it is provided according to the invention that the load sensor is a piezo-electric body having electrodes which are connected to the input of an electric amplifier which is fed by a battery housed in the handle portion of the wrench and which controls an electronic indicator.

The load sensor controls the indicator by using a piezo-electric effect. This acts as an electric load converter converting directly into an analogous electric voltage the mechanical load which may be pressure, tension or torsion. The conversion is linear within a broad range so that corrections of the measuring voltage are not necessary.

The piezoelectric body may consist of a quartz crystal or of a ceramic material equipped to receive power or torsion. Upon a mechanical loading, it supplies an electric charge being directly proportional to the load value. This charge signal is transmitted to the charge amplifier connected thereto. Here, a change of impedance is taking place inter alia so that the initial voltage of the amplifier can be processed without a reaction.

In a preferred embodiment of the invention, the permanent memory for retaining the maximum value of the torque measured is connected before the indicator. If the peak value memory is connected directly behind the amplifier, it is an analog value memory. According to another possibility, use is made of a digital memory. In this case, the peak value memory is arranged behind a digital-to-analog-converter converting the momentary values of the measuring voltage into digital values.

It is only necessary for the battery to supply the energy for the amplifier and for the indicator, no energy need be made available for the piezoelectric pressure converter, because the distribution of charge is realised as a function of pressure without an auxiliary energy source.

The operation of the wrench head does not necessarily call for the above mentioned peak value memory. However, the peak value memory is most suitable when the device comprises a digital or numerical indicator, because, during the use of the torque wrench, with a permanently changing numerical indication, it is very difficult to determine the maximum value. To erase the contents of the peak value memory, an erasing switch can be provided near the handle and may be also easily operated during the use of the torque wrench.

The load sensor can operate subject to different types of loads. Conveniently, it is a pressure sensor. In a preferred embodiment of the invention, the engaging portion has a lever arm pointing more or less in the direction to the handle lever and forming a first clamping element for the piezoelectric body, while the second clamping element is connected to the handle lever hinged at the engaging member. Upon tightening of a screw by the force acting on the handle lever, the handle lever moment is transferred to the engaging member via the piezoelectric body. The amount of the power transmitted is proportional to the torque, and the mechanical-electrical signal conversion is linear, thus the indicator shows a torque indication being exactly proportional to the torque acting on the wrench head.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a side view of the torque wrench according to the present invention;

FIG. 2 shows a plan view of the wrench according to FIG. 1, the cover plate of the wrench head being removed and FIG. 3 shows a block diagram of the torque measuring system.

DETAILED DESCRIPTION OF THE INVENTION

At the front end of the handle lever 10, there is a wrench head 11 comprising an engaging member 12 with a square portion 13 projecting out of the wrench head. It is possible to fit the square portion 13 with a button die which may be placed on a screw head to be rotated. The engaging member 12 can be connected with the wrench head 11 via a (non-illustrated) ratchet which, upon a rotation of the handle lever 10, entrains the engaging member in one sense of rotation, while handle lever and engaging member are decoupled of each other in the opposite sense of rotation.

At the end of the handle lever 10 turned away from the wrench head 11, there is the handle 14 followed by a casing portion 15 to receive the indicator 16 and by a casing 17 to house one or several batteries 18.

As evident from FIG. 2, the handle lever 10 protrudes into the inside of the wrench head where it is connected to the engaging member 12 by means of a hinge 19. The engaging member 12 has an extension 20 pointing towards the handle lever and forming one clamping element for the piezoelectric body 21, which is provided in a recess 22 of the handle lever 10 inside the wrench head 11, and which is pressed against the bottom of the recess 22 by means of the handle lever 20. From the piezoelectric body 21 fitted with (non-illustrated) electrodes, lines 23 extend through the hollow lever into the casing portions 17 and 15. The lines 23 are clearly visible in FIG. 2 and in FIG. 3. From the piezoelectric body 21, they extend to an amplifier 24 housed in the casing portion 15. The amplifier 24 has a low output resistance, and performs an impedance conversion and amplification of the voltage generated at the piezoelectric body 21. Its output is connected to a peak value memory 25 which, for example, contains a diode and a capacitor. In addition its output stores the peak value amplitude of the corresponding voltage characteristic. The peak value memory 25 must be placed under the action of an erasing signal by means of a switch 26 to reset the memory contents to zero. Switch 26, as evident from FIG. 2, is near the handle 14 and may be designed for example as a push-button.

The output of the peak value memory 25 is connected to an analog-digital converter 27 converting the analog signal supplied to its input into digital values to control the indicator 16. The indicator may be fitted with a multidigit liquid crystal display or with several light-emitting diodes.

Torque wrenches intended for right-hand as well as for left-hand operation comprise a selector switch 28 provided adjacent to the erasing key 26, and permitting a corresponding switch-over. In such a case, a second (non-illustrated) piezoelectric body can be provided which, upon a rotation of the handle lever 10 according to FIG. 2 in counterclockwise direction, is clamped between two clamping elements and whose load is indicated by the indicating device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque wrench having a head comprising:
   an engaging member capable of being coupled antirotationally with a member to be tightened;
   a handle lever movable within limits relatively to the engaging member;
   a load sensor provided between the engaging member and the handle lever and controlling an indicating means;
   wherein the load sensor is a piezoelectric body (21) fitted with electrodes connected with the input of an electric amplifier (24) which is fed by a battery (18) housed in the handle lever (10) and which controls an electronic indicator (16) and wherein the indicator (16) is inserted before a peak value memory (25) for retaining the maximum value of the measured torque.

2. A torque wrench according to claim 1, wherein the contents of the peak value memory (25) is erasable by an erasing switch (26).

3. A torque wrench according to claim 1, or 2, wherein the engaging member (12) has a lever arm (20) pointing approximately towards the handle lever (10) and forming a first clamping element for the piezoelectric body (21), while the other clamping element is connected to the handle lever (10) which is hinged at the engaging member (12).

4. A torque wrench for indicating the tightening torque applied to a member to be tightened comprising:
   a head including engaging means for antirotationally being coupled to a member to be tightened;
   a handle lever being movable to a limited degree relative to said engaging means;
   a load sensor being operatively positioned between said engaging means and said handle lever, said load sensor being a piezoelectric cell including electrodes;
   an indicating means being operatively connected to said load sensor;
   an electric amplifier being operatively connected to said electrodes of said piezoelectric cell and to a battery;
   said electric amplifier being operatively connected to said indicating means to actuate said indicating means to indicate the torque sensed by said load sensor; and
   a peak value memory for retaining the maximum value of the torque sensed by said load sensor.

5. A torque wrench according to claim 4, wherein said indicating means is a digital read out display.

6. A torque wrench according to claim 4, and further including an erasing switch for erasing the contents of said peak value memory.

7. A torque wrench according to claim 4, wherein said engaging means includes a lever arm extending along said handle lever, said lever arm forming a first clamping element connected to said piezoelectric cell, a second arm being hinged to said engaging means and connected to the handle lever forming a second clamping element connected to said piezoelectric cell.

* * * * *